Jan. 17, 1956

D. MELCHER ET AL 2,731,625

TELEMETRIC SYSTEM

Filed Sept. 26, 1951

INVENTORS
David Hilowitz
BY Daniel Melcher

Frank A. Bower
ATTORNEY

Jan. 17, 1956  D. MELCHER ET AL  2,731,625
TELEMETRIC SYSTEM

Filed Sept. 26, 1951  2 Sheets-Sheet 2

INVENTORS
David Hilowitz
BY Daniel Melcher

Frank A. Bower
ATTORNEY

United States Patent Office 2,731,625
Patented Jan. 17, 1956

2,731,625

TELEMETRIC SYSTEM

Daniel Melcher, Montclair, and David Hilowitz, West Caldwell, N. J.

Application September 26, 1951, Serial No. 248,326

10 Claims. (Cl. 340—203)

This invention relates to telemetric instruments for fluid meters and particularly for fluid meters used in domestic installations.

Fluid meters are often located in inaccessible places or places where it is inconvenient or difficult to make a reading as in the case of domestic gas meters. In the latter instances it is desirable to have a dial remote from the gas meter readable from outside of the house. (Fluid meters themselves, unlike electric meters, cannot be exposed to extremes of temperature.) This would eliminate the necessity of the gas meter reader entering the house or making estimated readings when entry was not possible. With a remote gas meter dial readable from outside the house the reader would be independent and would not have to gain admittance to the house. Such a remote system should be inexpensive, readily adaptable both to present gas meters and to standard maintenance procedures and durable in construction to withstand many years of operation without affecting the accuracy of the gas meter.

The object of this invention is to provide a telemetric system for fluid meters that will dependably show the meter readings at a remote point and is accurate and reliable over a period of years of continual usage.

Another object of the invention is to provide a telemetric system which is operable independently of an outside power source and which is actuated by the movement of the meter parts.

Another object of this invention is to provide a telemetric instrument that is inexpensive and durable, requiring a minimum of maintenance, and operating over a long period of time without requiring servicing or repair.

Another object of this invention is to provide a telemetric instrument that may be readily attached as a supplement to the present conventional domestic gas meter outside of the gas sealed chamber, using the meter without alteration of the moving members thereof, and without affecting its accuracy.

Other and further objects will appear from the following specification in connection with the accompanying drawings in which.

Figure 3:
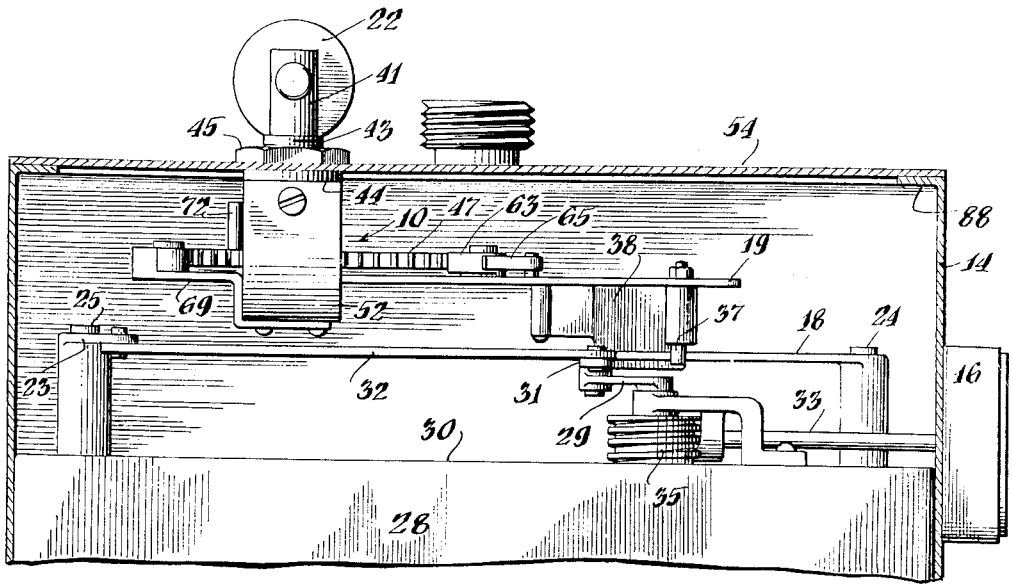
Fig. 3 is a cross-sectional view of the telemetric transmitter taken approximately in the plane of the lines 3—3 of Fig. 1.
Figure 4:
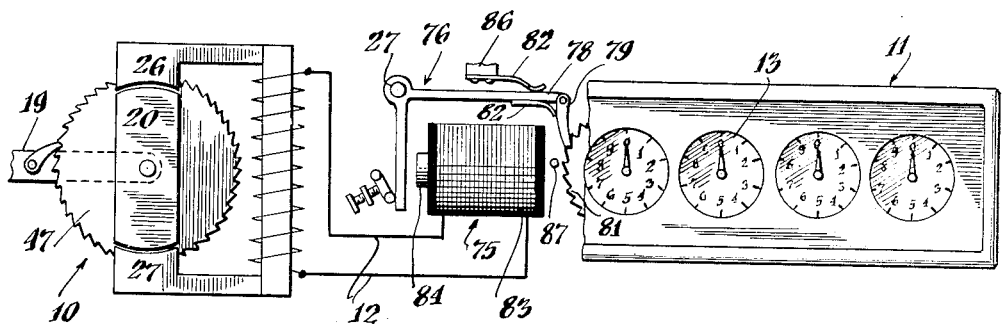
Fig. 4 is a schematic showing of the remote telemetric system with a view of the remote indicator.

Referring first to Figs. 3 and 4 of the drawing, there is shown a remote telemetric system comprising an electrical impulse transmitter indicated generally at 10, and a remote reader indicated generally at 11, and connected to the transmitter by an electrical cable indicated at 12.

The remote reader 11 has a set of indicator dials 13 that registers the measurements of the gas meter 14 (Fig. 1) corresponding to the readings on the dial of the local reader 16 (Fig. 1) thereof. The power to drive the impulse transmitter 10 is derived from the arm 18 (Fig. 1) which is a part of the movable linkage of the meter. This renders the telemetric system operable in response to the movement of the meter parts. The meter arm 18 actuates the lever 19 of the transmitter. The lever 19 slowly moves the permanent magnet 20 out of alignment with the stationary armature or core poles 26, 27 until a position past dead center is reached, from which the permanent magnet snaps ahead into the reverse position but again in alignment with the core poles. The resulting rapid movement induces an impulse in the coil 22 that is transmitted to the remote reader 11 (Fig. 4) by the cable 12. This impulse is translated at the reader 11 into a meter reading corresponding to that of the dial of the local reader 16.

Figures 1, 2:
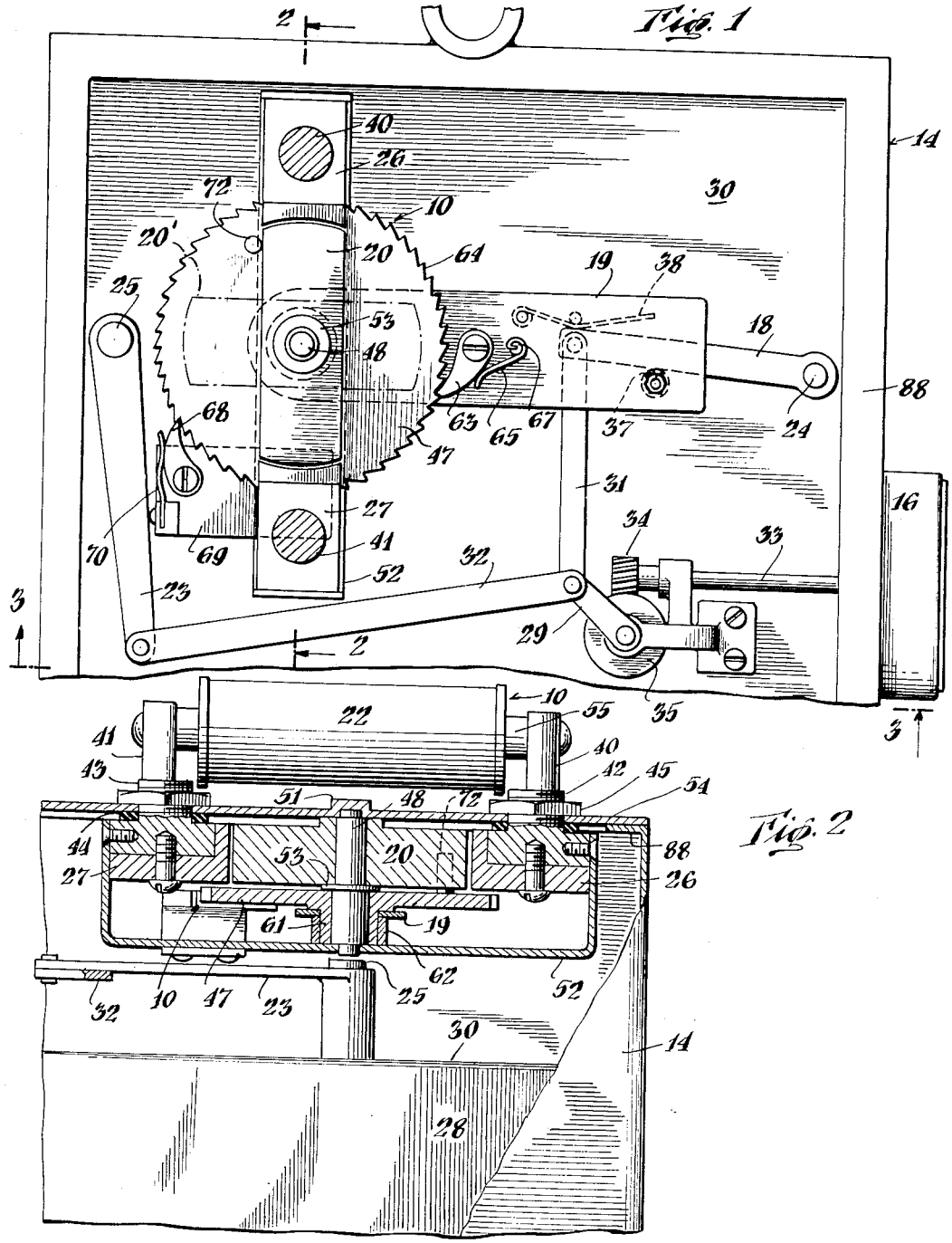
Fig. 1 is a top view of the telemetric transmitter mounted on a conventional gas meter with the cover removed.
Fig. 2 is a cross-sectional view of the telemetric transmitter taken approximately in the plane of the lines 2—2 of Fig. 1.

Referring to Fig. 1, the conventional gas meter 14 has two arms 18 and 23 mounted on shafts 24 and 25 respectively extending through gas sealed openings in the wall 30. The shafts are connected to the measuring bellows (not shown) in the gas sealed chamber 28 (Fig. 2) below the horizontal wall 30. The meter bellows oscillate the shafts 24, 25 and arms 18, 23 through limited arcs. The arms 18, 23 are both connected to a crank arm 29 by the links 31, 32 respectively. Their combined motion rotates the crank arm 29, which turns the shaft 33 through the worm 35 and worm gear 34, and so actuates the local reader 16. The length of the crank arm 29 may be adjustable, and is made such that each revolution of the arm corresponds to a definite amount of gas passing through the meter and indicated on the local reader 16.

Referring now to Fig. 2 the transmitter 10 is mounted on a substitute gas sealing cover 54 which is dimensioned to replace the regular cover. The transmitter is coupled to the gas meter by the lever 19 overlapping the arm 18 (Fig. 1) and having a downward projecting pin 37 and a leaf spring 38 engaging the opposite sides of the lever 18, so that as the lever 18 oscillates the lever 19 follows. Because these two members alone interconnect the gas meter mechanism and the transmitter, it is seen that the transmitter 10 may be removed with the cover 54 without disturbing the connections of the various levers, links and crank of the meter.

The transmitter 10 has posts 40, 41 (Fig. 2) extending through the cover 54 and bolted to opposite ends of the core 55 of the coil 22. The posts and core are made of ferromagnetic material such as soft iron, and form a magnetic path. The spaced pole pieces 26, 27 are mounted on the inner ends of the posts 40, 41. The posts are preferably cylindrical in shape, with portions 42, 43 threaded, and are held in place by gas-sealing washers 44 and nuts 45.

The magnet 20, ratchet wheel 47, and lever 19 are rotatably mounted on a shaft 48. The shaft 48 is journaled at one end in a bearing 51 in the cover 54, and at the other end in a strap 52, secured in this embodiment to the pole pieces 26, 27. The magnet 20 rests and turns on the shoulder 53 of the shaft 48. The hub 61 of the ratchet wheel 47 rests on the strap 52, with an independent collar 62 around it for holding the lever 19 between the collar 62 and the ratchet wheel 47.

As shown in Fig. 1 the ratchet wheel 47 is turned counterclockwise by a pawl 63 pivotally mounted on the lever 19, and held in engagement with the ratchet teeth 64 by a spring 65 attached to the lever 19 at 67. When the lever 18 bears against the pin 37 the lever 19 turns on the shaft 48 and the pawl 63 catches in a tooth, thus turning the wheel 47 through a small angle. On the return stroke the lever 18 bears against spring 38, thereby returning the lever 19 to its initial position and the pawl 63 is drawn back over the teeth. The wheel 47 is held in place by a stop pawl 68 pivotally mounted on an extension 69 of the strap 52, with a spring 70 to hold it in engagement. Thus the oscillation of the lever 18 causes intermittent rotation of the wheel 47. A pin 72 is rigidly mounted on and projects upwardly from the wheel 47, and engages the magnet 20 and displaces it from the illustrated aligned position between the poles. On the return stroke of the lever 19 the pin 72 holds the magnet 20 in the displaced position, despite the tendency of the magnet to return to its former position. When the magnet 20 has been displaced approximately ninety degrees, to the broken line position 20′ (Fig. 1), it snaps forward an additional 90° and realigns itself with the poles. This quick swing of the armature causes a rapid fluctuation of the lines of force of the magnetic field in the core 55 (Fig. 2), thereby creating a momentary voltage across the coil 22. No spring is needed to produce the desired rapid movement. The lever 19 then continues to slowly turn the wheel 47 step by step, and the magnet 20 stays in position until the pin 72 catches up and engages it again.

Each complete oscillation of the gas meter may measure, for instance, one-sixth of a cubic foot of gas consumed. In this specific embodiment the wheel 47 has one hundred and twenty teeth, and the pawl engages each tooth and turns the gear three degrees on each actuation, so that a complete revolution of the wheel measures twenty cubic feet of gas consumed. Since two impulses are created on each revolution of the gear, each impulse measures ten cubic feet of gas consumed.

In Fig. 4 the remote reader is shown comprising an electromagnet 75 actuating an armature 76 on energization by the electrical impulses from the transmitter 10. The armature is pivotally mounted at 77, and has a lever arm 78 extending perpendicularly therefrom. The arm 78 has a pawl 79 held in engagement with the ratchet gear 81 by a spring 82.

The electromagnet 75 has a coil 83 wound around a soft iron core 84. The ends of the coil 83 are connected to the cable 12 and receive the electrical impulses from the transmitter 10 thus energizing the coil, and magnetizing the soft iron core 84. The armature 76 is drawn against the core 84, pressing the lever 78 against a spring 82 fastened at 86 to the frame or casing. After the electrical impulse has ceased the armature 76 is released, and the spring 82 presses the pawl 79 against the ratchet gear 81, turning it until the pawl engages the stop 87. The pointer of the dial moves, indicating the gas measured.

In Figs. 2 and 3, the cover 54 rests on the flange 88 extending around the edge of the meter and is made of a non-magnetic material. The edge of the cover and the flange may be sealed in any conventional way to prevent leakage, for instance by soldering. The electrical parts of the transmitter are isolated from the gas sealed portion of the meter. Any leakage of gas that may occur around posts 24 and 25 within the meter will not come in contact with the electrical wires. Any possibility of explosion due to sparking of the wires is eliminated.

One main advantage of this device is its complete independence of any other source of power to operate it. The transmitter 10 is driven by the flow of gas through the meter, and when the gas flows the transmitter operates. There is no dependence on any other source of power to operate the remote device. This greatly reduces the possibility of failure, and though other sources of power may fail, the system will continue to register the gas consumed.

The mechanical drag of the transmitter 10 on the already existing measuring mechanism of the meter is negligible, and in practice undetectable, though if necessary it could be easily allowed for by the regular compensating mechanism of the gas meter, since any drag will remain substantially constant over long periods. The permanent magnet is not subject to jarring or shock, and will retain its magnetism over long periods of time. With the use of permanent magnets of the type with high retentivity, the magnet will last at least the life of the gas meter itself. The retentivity is aided because the stationary core and core poles act as a keeper for the magnet. Also the frictional resistance between metal surfaces is slight, and the wear negligible between the parts. The impulses created by the electromagnet are of alternate polarity, each pulse counteracting any magnetizing effect of the previous pulse, and thus keeping the members of the remote device and adjacent gas meter components demagnetized. A standard gas meter may be used without change except for replacement of the cover.

A feature of this invention is the insulation of the electrical components from the actuating members and moving parts of the fluid meter, so that no short circuit or accidental electric spark could possibly ignite the fluid being measured, and so that the electrical parts do not come in contact with or become contaminated by the fluid being measured, or by lubricants or other undesirable material. The measurements of the meter may then be easily transmitted to remote locations where it is desirable to have an indication of the amount of fluid measured by the meter. In Fig. 2 an electrical impulse creating means such as the coil 22 is external to the casing, and is energized or excited by the varying lines of force carried by the energy transferring means such as the pole pieces 26, 27. The flux variation is created by rapid movement of the magnet from an unstable position indicated in broken lines at 20′, to a stable position 20 shown in solid lines between the poles. The magnet when at position 20′ is in an extended flux coupling relation with the pole pieces and the lines of force pull the magnet into a closer flux coupling relation since the magnet is detachable from control of the lever 19 and wheel 47. These means for energizing the poles, which poles also support the electrical impulse creating means, are actuated by the moving parts of the meter. Thus the meter measurements can be transmitted outside the sealed casing to a remote reader or receiving means.

It is understood that the invention may be used on other types of meters for measuring fluids, and is not necessarily limited to domestic gas meters.

Although one particular embodiment of the invention has been disclosed, it will be understood that various modifications may be made, for adaptation to particular requirements, without departing from the scope of the invention as sought to be claimed in the following claims.

We claim:

1. In a remote reading gas meter system wherein a gas meter is connected to a remote integrating register by means of electrical conductors, the combination with a gas meter having a sealed gas meter wall, of a magnetic circuit comprising a generally U-shaped member and a bar member, one of said members being permanently magnetized and the other being permeable, the legs of said U-shaped member passing through the aforesaid wall and being sealed thereto with a gas-tight seal, the bar member being pivotally mounted for rotational movement inside the wall relative to the U-shaped member, means operatively linking said bar member with the regular linkage of the gas meter for rotation thereby, said means including a unidirectional connection such that the bar member can turn ahead of the linkage under magnetic attraction after being moved by the linkage to a point beyond magnetic dead center, and a coil on said U-shaped member outside the wall for connection to conductors leading from said coil to a remote pulse operated integrating register, the movement of the magnetic system caused by the gas meter linkage being the sole source of electrical power for the system.

2. In a remote reading gas meter system wherein a gas meter is connected to a remote integrating register by means of electrical conductors, the combination with a gas meter having a sealed gas meter housing, of a magnetic circuit comprising first and second members disposed to form a substantially closed magnetic circuit, one of said members being permanently magnetized and the other being permeable, one of said members being stationary on said housing, the other of said members being inside the housing and pivoted for rotational movement relative to the stationary member, means operatively linking said pivoted member with the regular linkage of the gas meter for rotation thereby, said means including a unidirectional connection such that the pivoted member can turn ahead of the linkage under magnetic attraction after being moved by the linkage to a point beyond magnetic dead center, and a coil on said stationary member outside the housing for connection to conductors leading from said coil to a remote pulse operated integrating register, the movement of the magnetic system caused by the gas meter linkage being the sole source of electrical power for the system.

3. In a remote reading gas meter system wherein a gas meter is connected to a remote integrating register by means of electrical conductors, the combination with a gas meter having a sealed wall, of a permanent magnet rotatably carried inside the wall, a generally U-shaped permeable core disposed with its legs passing through the gas meter wall and sealed thereto with a gas-tight seal, the ends of said legs being disposed inside the wall adjacent the ends of the magnet to form a closed magnetic circuit, means operatively linking said magnet with the regular linkage of the gas meter for operation thereby, said means including a unidirectional connection such that the magnet can turn ahead of the linkage under magnetic attraction after being moved by the linkage to a point beyond magnetic dead center, and a pulse generating coil on the core outside the wall for connection to conductors leading from said coil to a remote pulse operated integrating register, the movement of the magnetic system caused by the gas meter linkage being the sole source of electrical power for the system.

4. In a remote reading gas meter system wherein a gas meter is connected to a remote integrating register by means of electrical conductors, the combination with a gas meter having a sealed cover, of a permanent magnet rotatably carried inside the cover, a generally U-shaped permeable core disposed with its legs passing through the cover and sealed thereto with a gas-tight seal, the ends of said legs being disposed inside the cover adjacent the ends of the magnet to form a closed magnetic circuit, means operatively linking said magnet with the regular linkage of the gas meter for operation thereby, said means including a unidirectional connection such that the magnet can turn ahead of the linkage under magnetic attraction after being moved by the linkage to a point beyond magnetic dead center, and a pulse generating coil on the U-shaped core outside the cover for connection to conductors leading from said coil to a remote pulse operated integrating register, the movement of the magnetic system caused by the gas meter linkage being the sole source of electrical power for the system, the aforesaid cover being so dimensioned and shaped that it may be used on a standard gas meter in lieu of its regular cover.

5. In a remote reading gas meter system wherein a gas meter is connected to a remote integrating register by means of electrical conductors, the combination with a gas meter having a sealed housing, of a ratchet wheel, a feed pawl and pawl arm for said wheel, means operatively linking said pawl arm with the regular linkage of the gas meter for operation thereby, a check pawl for said wheel, said wheel and pawls being located inside the meter housing, a magnetic circuit comprising first and second members disposed to form a substantially closed circuit, one of said members being permanently magnetized and the other being permeable, one of said members being stationary, the other of said members being inside the meter housing and connected to said ratchet wheel for rotation relative to the stationary member, and a coil on said stationary member for connection to conductors leading from said coil to a remote pulse operated integrating register, the movement of the magnetic system caused by the gas meter linkage being the sole source of electrical power for the system.

6. In a remote reading gas meter system wherein a gas meter is connected to a remote integrating register by means of electrical conductors, the combination with a gas meter having a sealed gas meter wall, of a ratchet wheel, a feed pawl and pawl arm for said wheel, means operatively linking said pawl arm with the regular linkage of the gas meter for operation thereby, a magnetic circuit comprising a generally U-shaped member and a bar member, one of said members being permanently magnetized and the other being permeable, the legs of said U-shaped member passing through the aforesaid wall and being sealed thereto, the bar member being connected to said ratchet wheel for rotation relative to the U-shaped member, said wheel and pawl and bar being located inside the wall, and a coil on said U-shaped member outside the wall for connection to conductors leading from said coil to a remote pulse operated integrating register.

7. In a remote reading gas meter system wherein a gas meter is connected to a remote integrating register by means of electrical conductors, the combination with a gas meter having a sealed cover, of a ratchet wheel rotatably carried by said cover, a feed pawl and pawl arm for said wheel, means operatively linking said pawl arm with the regular linkage of the gas meter for operation thereby, a check pawl for said wheel, a magnetic circuit comprising a generally U-shaped member and a bar member, one of said members being permanently magnetized and the other being permeable, the legs of said U-shaped member passing through the aforesaid cover and being sealed thereto, the bar member being connected to said ratchet wheel for rotation relative to the U-shaped member, said wheel and pawls and bar being located inside the cover, and a coil on said U-shaped member outside the cover for connection to conductors leading from said coil to a remote pulse operated integrating register, the aforesaid cover being so dimensioned and shaped that it may be used on a standard gas meter in lieu of its regular cover.

8. In a remote reading gas meter system wherein a gas meter is connected to a remote integrating register by means of electrical conductors, the combination with a gas meter having a sealed housing, of a ratchet wheel, a feed pawl and pawl arm for said wheel, means operatively linking said pawl arm with the regular linkage of the gas meter for operation thereby, a check pawl for said wheel, a permanent magnet carried diametrically relative to said wheel for rotation therewith, said wheel and pawls and magnet being carried inside the housing, a generally U-shaped permeable core, the ends of said core being disposed adjacent the ends of the magnet to form a closed magnetic circuit, and a pulse generating coil on the core for connection to conductors leading from said coil to a remote pulse operated integrating register, the movement of the magnetic system caused by the gas meter linkage being the sole source of electrical power for the system.

9. In a remote reading gas meter system wherein a gas meter is connected to a remote integrating register by means of electrical conductors, the combination with a gas meter having a sealed wall, of a ratchet wheel, a feed pawl and pawl arm for said wheel, means operatively linking said pawl arm with the regular linkage of the gas meter for operation thereby, a permanent magnet carried diametrically relative to said wheel for rotation therewith, said wheel and pawls and magnet being located inside the wall, a generally U-shaped permeable core disposed with its legs passing through the gas meter wall and sealed thereto with a leak-proof connection, the ends of said legs being disposed inside the wall adjacent the ends of the magnet to form a closed magnetic circuit, and a pulse generating coil on the core outside the wall for connection to conductors leading from said coil to a remote pulse operated integrating register.

10. In a remote reading gas meter system wherein a gas meter is connected to a remote integrating register by means of electrical conductors, the combination with a gas meter having a sealed cover, of a ratchet wheel rotatably carried by said cover, a feed pawl and pawl arm for said wheel, means operatively linking said pawl arm with the regular linkage of the gas meter for operation thereby, a check pawl for said wheel, a permanent magnet carried diametrically of said wheel for rotation therewith, said wheel and pawls and magnet being carried inside the cover, a generally U-shaped permeable core disposed with its legs passing through the cover and sealed thereto with a leak-proof connection, the ends of said legs being disposed inside the cover adjacent the ends of the magnet to form a closed magnetic circuit, and a pulse generating coil on the U-shaped core outside the cover for connection to conductors leading from said coil to a remote pulse operated integrating register, the aforesaid cover being so dimensioned and shaped that it may be used on a standard gas meter in lieu of its regular cover.

References Cited in the file of this patent

UNITED STATES PATENTS

| 427,014 | Roberts | Apr. 29, 1890 |
| 2,441,760 | Giannini et al. | May 18, 1948 |
| 2,471,947 | Giannini | May 31, 1949 |
| 2,518,149 | Kearsley | Aug. 8, 1950 |
| 2,630,714 | Zimmerman | May 10, 1953 |

FOREIGN PATENTS

| 186,989 | Great Britain | Oct. 9, 1922 |
| 624,654 | Germany | Jan. 25, 1936 |